Oct. 31, 1944.   J. BANNEYER   2,361,732
CONDUIT SUPPORTING DEVICE
Filed Aug. 27, 1942   2 Sheets-Sheet 2
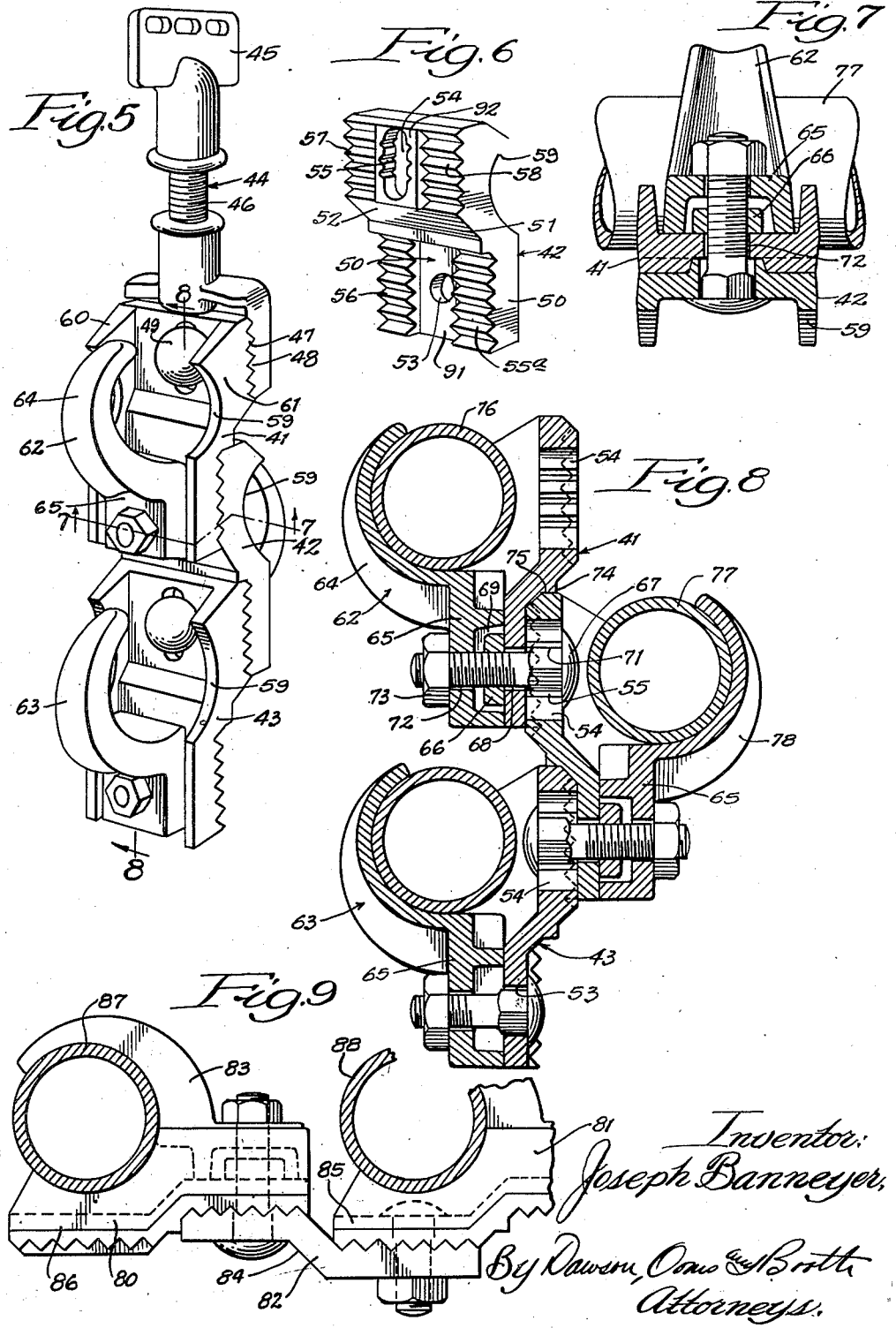

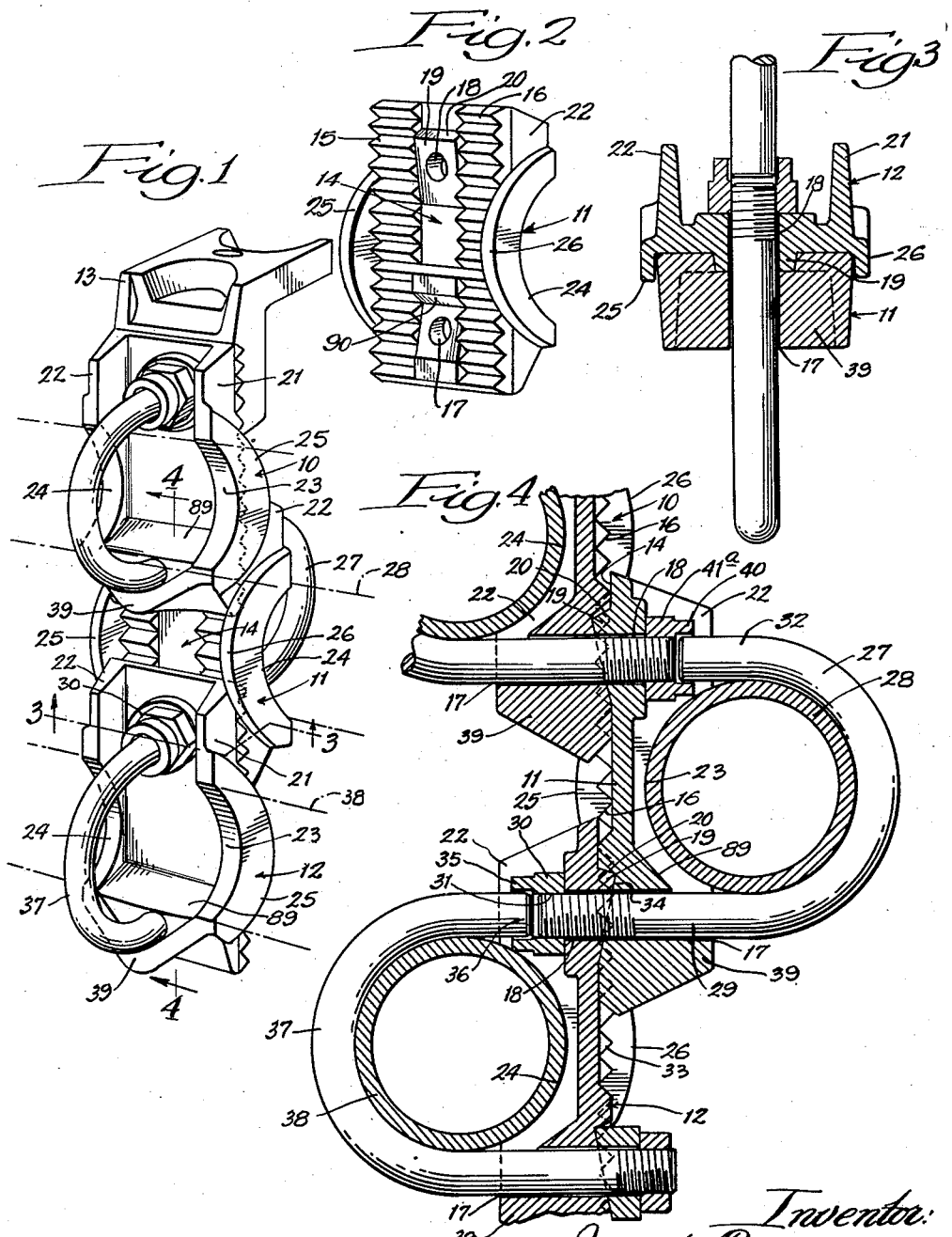

Patented Oct. 31, 1944

2,361,732

UNITED STATES PATENT OFFICE 2,361,732

CONDUIT SUPPORTING DEVICE

Joseph Banneyer, Chicago, Ill.

Application August 27, 1942, Serial No. 456,332

6 Claims. (Cl. 248—68)

This invention relates to conduit supporting devices, and more particularly to devices for separately supporting a plurality of conduits in varied and superimposed relation.

An object of the invention is to provide a simple structure which may be readily assembled to engage and support a plurality of conduits.

Another object is to provide a structure for supporting a conduit and for firmly locking the same in the supported position. Another object is to provide in conduit supporting devices, means for engaging conduits to support the same and means for locking the conduits in position to prevent lateral movement thereof. Yet another object is to provide conduit supporting devices having a relatively small number of parts, the parts being of such a character that by the use of an additional number of identical parts, additional conduits may be supported.

Another object of the invention is to provide in conduit supporting devices, means for longitudinally adjusting the supporting members with respect to each other and for locking the members in any of a plurality of predetermined positions. Still another object is to provide conduit supporting devices which themselves may be carried or supported in any of a variety of ways. A further object is to provide single means for securing to each other, a pair of adjacent conduit supporting members, said means also serving to secure to one of the members a clamp for engaging a conduit and being separately releasable as to the clamp and the members. A further object is to provide equipment for supporting three or more conduits in a desired superimposed relation.

Other features and advantages will appear from the following specification and drawings, in which—

Fig. 1 is a perspective view of a device embodying the invention; Fig. 2 is a perspective view of one of the members for engaging the conduit; Fig. 3 is a transverse sectional view taken along the line 3—3 of Fig. 1; Fig. 4 is a fragmentary vertical sectional view taken along the line 4—4 of Fig. 1; Fig. 5 is a perspective view of another embodiment of the invention; Fig. 6 is a perspective view of one of the members of the device shown in Fig. 5; Fig. 7 is a transverse sectional view showing a conduit supported by the device; Fig. 8 is a fragmentary vertical sectional view taken along the line 8—8 of Fig. 5; and Fig. 9 is a view partly in section and partly in elevation showing a modified form of the embodiment of the invention shown in Figs. 5 to 8.

In the embodiment of the invention shown in Figs. 1 to 4, a plurality of conduit engaging members 10, 11 and 12 are supported in adjacent and interlocking relation. A bracket 13 of any suitable or conventional type may be secured to the member 10 and is adapted to be attached to any suitable surface to support the unit.

As seen particularly in Fig. 2, the conduit engaging member 11 may include a flat body 14 provided with teeth or serrations 15 and 16 extending longitudinally thereof. The body is equipped with a pair of spaced apertures 17 and 18. A portion 19 adjacent the aperture 18 is thickened to provide a wall of the aperture which is of substantially increased length. The thickened portion 19 also provides a shoulder 20 which is utilized in securing the member 11 in interlocking relation with the member 10, as will hereafter be described.

As seen in Figs. 1 and 2, the members 10, 11 and 12 are each equipped with a pair of ribs 21 and 22 extending longitudinally thereof along the side portions of the same. Preferably, the ribs are provided with arcuate surfaces 23 and 24 for engaging the arcuate wall of a conduit. The ribs 21 and 22 are continued on the other side of the member 10 to form projecting channel members 25 and 26. The channel members 25 and 26 provide a channel for engaging the side walls of the adjacent member 11.

A clamp member 27 is adapted to cooperate with the member 11 to support a conduit 28. The clamp 27 may consist of a U-shaped member having an arcuate portion for engaging the wall of the conduit and for extending about the same. Extending portions 29 and 32 which form the legs of the U-shaped member are received within the apertures 17 and 18 in the member 11 to complete the enclosure of the conduit 28. As shown, the clamp member 27 may be in the form of a rod or tube.

As seen particularly in Fig. 4, the extending portion 29 of the clamp member 27 is externally threaded at 31 and receives a nut 30 which is disposed on the opposite side of the member 11 and tightens the clamp in position with respect to the member. At the same time, the tightening of the nut 30 on the extending portion 29 of the clamp 27 brings the member 11 into overlapping and interlocking engagement with the member 12. In this relation, the serrated portion 33 of the member 12 engages the serrated portion 16 of the member 11, and the shoulder 20 of the member 12 is received within a recess 34 of the member 11 and engages the wall thereof.

The nut 30 may be equipped with a collar 35 for receiving the end portion 36 of the clamp 37 about the conduit 38. This collar, which receives the end portion of the clamp 37, prevents lateral or longitudinal movement of the clamp with respect to the member 12.

As seen particularly in Figs. 1 and 4, each of the members 10, 11 and 12 is equipped with a V-shaped portion 39 extending from the surface thereof, the portion 39 of the member 11 being adapted to engage the extending portion 29 of the clamp 27. The wall of the portion 39 engages the clamp 27 throughout a substantial longitudinal portion thereof and thus, with the thick portion 19 on the other surface of the member 12, provides means for preventing lateral pivotal movement of the clamp 27 about the point of junction thereof with the member 12, in a plane transverse to the axis of the conduit 28.

The central longitudinal portion of the body 14 of the member 11 may be recessed to receive a longitudinally-projecting portion of the adjacent member and thus provide an interlock against lateral movement of the members with respect to each other. This construction is seen particularly in Fig. 3 wherein the projection 19 of the member 12 is received within the body of the member 11. The V-shaped portion 39 of each member engages a substantial longitudinal section of the clamp which passes therethrough. The member adjacent the V-shaped portion 39 is built up as at 89 to provide a thickened portion for engaging the opposite side of the clamp.

Adjacent the aperture 17 at the lower end of the member 11 is a recess providing a wall 90 for engaging the abutting end 20 of the thickened portion of an adjacent member. This engagement aids in establishing an interlocking relation between the members which prevent longitudinal movement of the members with respect to each other.

In assembling the device shown in Figs. 1 to 4, any suitable number of conduit engaging members may be used. With each conduit engaging member, there will, of course, be associated a clamp for engaging the opposite side of the conduit and for supporting the same between the clamp and the member.

The members 10, 11 and 12 may be placed in overlapping relation, as seen in Fig. 1, with each of the members engaging the opposite surface of an adjacent member. The members, of course, may be identical in construction. The members are placed in position with respect to the conduits which are to be supported, and the clamps 27 and 37 are placed about the conduits 28 and 38, one clamp being used for each conduit engaging member.

As seen particularly in Fig. 4, when the members are arranged in overlapping relation, the serrated surface 33 of the member 12 engages in interlocking relation the serrated surface 16 of the member 11, and the shoulder 20 of the member 11 engages the wall of the recess 34 of the member 12. The tightening of the nut 30 tightens the clamp 27 about the conduit 28, and also serves to secure the members 11 and 12 in interlocking relation with each other. The extending portion 32 at the opposite end of the clamp 27 is received within the collar 40 of the nut 41a and is thus locked against lateral or longitudinal movement with respect to the adjacent members.

The device may be quickly assembled to support a plurality of conduits in desired position and single means is used for securing the members in interlocking relation and for at the same time attaching the clamps to the members. The clamps are locked against lateral pivotal movement about the point of junction thereof with the members in a plane transverse to the axis of the conduits. This feature is of great importance since the greatest strain on the clamp members is in this direction.

In the embodiment of the invention shown in Figs. 5 to 9, a plurality of identical members 41, 42 and 43 are arranged in overlapping and interlocking relation. One of the members 41 may be secured to a bracket 44 to mount the assembly. The bracket 44 may be of any suitable or conventional construction and may be provided with a plate 45 adapted to be secured to a suitable wall or mounting surface. A turnbuckle 46 permits longitudinal adjustment of the bracket 44. A serrated surface 47 of the bracket 44 may be brought into interlocking relation with the serrated surface 48 of the member 41, and a bolt 49 may be used to fix the member and bracket in interlocking relation.

The member 41, as seen particularly in Fig. 6, may include a body portion 50, which is offset at 51 to provide a beveled surface 52. The member is equipped with a pair of spaced apertures 53 and 54, the aperture 54 being elongated and being provided with spaced projections 55 along the inner sides thereof. The member 42 may be equipped with teeth or serrations 55a, 56, 57 and 58, which are adapted to be used in bringing the member into interlocking relation with an adjacent identical member. As seen in Figs. 5 and 6, an arcuate surface 59 on each of the members 41, 42 and 43 is adapted to engage the arcuate wall of a conduit. Preferably, the arcuate surface 59 is formed in a pair of spaced ribs 60 and 61 which extend along the sides of the member.

Clamp members 62 and 63 are adapted to be used in cooperation with the members 41 and 43, each of the clamp members being adapted to engage the opposite side of a conduit to support the conduit against the arcuate surface 59 of the adjacent member. The clamp members may be of any suitable construction, but should be provided with an arcuate portion which extends around the wall of the conduit in engagement thereof. Thus, the clamp 62 is equipped with an arcuate portion 64 and with a base 65. The base 65 is apertured to receive a bolt 67 extending through the member 41 to secure the clamp 62 in position on the member 41. The clamps 63 and 78 are similarly constructed.

As seen particularly in Fig. 8, the base 65 of the clamp 62 is equipped with a recess 69 within which may be received a nut 66 on the bolt 67. The bolt 67 passes through the elongated aperture 54 of the member 42. The bolt 67 is preferably of the carriage bolt type and is equipped with angular surfaces 71 for engaging the projections 55 of the recess 54 and thus preventing longitudinal movement and rotation of the bolt 67 within the elongated slot 54. The bolt also extends through the aperture 68 of the member 41 and receives the nut 66 to lock the members 41 and 42 in interlocking relation with respect to each other. The recess 69 in the base 65 of the clamp 62 receives the nut 66, and the aperture 72 in the base permits the bolt 67 to extend therethrough. A second nut 73 threadedly engages the end of the bolt 67 to lock the clamp 62 in position on the member 41.

When the members 41, 42 and 43 are brought together, the serrated portions are brought into interlocking engagement to prevent longitudinal movement of the members with respect to each other. As seen in Fig. 6, the central longitudinal portion of the member 42 at one end is recessed at 91 and at the other end is raised at 92 to provide longitudinal interlocking sections. These sections lock the members when the members are brought together against lateral movement with respect to each other.

With this construction, the single bolt 67 passing through the members 41, 42 and 62 serves to secure the unit in assembled relation. At the same time, by the use of the separate nuts 66 and 73 to secure the member 41 and clamp 62 respectively in position, it is possible to separately release the clamp 62 and member 41.

The central beveled portion of the member 41 may be provided with a shoulder 74 for engaging the end 75 of the member 42. Thus, the members are fixed in longitudinal position by the interlocking of the serrated surfaces thereof and also by engagement of the end 75 with the shoulder 74.

By offsetting the body 50 of the member 41 and of the other identical members, it is possible, as shown, to obtain a unit which extends in substantially the same plane.

When the device is to be assembled, the members 41 and 42 may be secured to each other by passing the bolt 67 through the slotted aperture 54 in the member 42 and the aperture 68 in the member 41. The nut 66, which threadedly engages the bolt 67, then locks the members in overlapping relation. The members may be adjusted longitudinally with respect to each other by placing the bolt 67 in the desired position within the slot 54. Any suitable number of additional identical members may be secured to the members 41 and 42, the assembly being of the type shown in Figs. 5 to 8. Since the additional members and clamps are substantially identical in construction, only one of the members is described in detail herein.

The members 42 are thus brought into interlocking relation and the nut 66 is tightened on the bolt 67. The interlocked members are placed in position adjacent the conduits which are to be supported, and the clamps 62 and 78 are placed about the conduits 76 and 77. The housings of the clamps are received about the nuts which hold the members in interlocking relation. The nut 73 is then brought into threaded engagement with the bolt 67 to lock the clamp 62 in position in engagement with the conduit 76. A similar operation is carried out as to any additional clamps and conduits.

In the modified form of the invention shown in Fig. 9, the construction corresponds to that shown in Figs. 5 to 8, except that all of the conduits are disposed on one side of the supporting members. Thus, the members 80 and 81 are joined by a link member 82, which itself does not support a conduit but merely serves to support the members 80 and 81 in adjacent relation with respect to each other. The clamp member 83 may be of the same construction as in the embodiment of the invention described in Figs. 5 to 8, and the assembly of the device may also correspond to this construction. The member 82 is offset at the center portion thereof to provide a beveled surface 84 and to bring the portion 85 of the member 81 into alignment with the portion 86 of the member 80. In this manner, the entire unit consisting of any desired number of members may be disposed in substantially the same plane, and the conduits 87, 88 and any additional conduits may be supported by the unit, with each of the conduits lying on the same side of the unit.

Although the invention has been described in connection with particular embodiments, such description is for the purpose of illustration only and it will be understood that changes and modifications may be readily made without departing from the spirit and scope of the invention.

I claim:

1. A device for supporting conduits and the like, comprising a conduit-engaging member, means engaging the upper portion of said member for supporting the same, said member depending from said supporting means, a second conduit-engaging member identical with said first-mentioned conduit-engaging member but faced in the opposite direction so that the back sides of the members are adjacent, said last-mentioned conduit member having its top portion overlapping the bottom portion of said first-mentioned member, a cable clamping member, and means for securing a cable between said clamping member and one of said conduit-engaging members and at the same time binding the overlapping portions of said conduit-engaging members together.

2. A device as set forth in claim 1 wherein said cable-securing means includes an arcuate member for engagement with a cable and an end portion which is threaded and extends through said overlapping portions, said securing means including also tapped means in engagement with said end portion for tightening said clamping member against said conduit-engaging members.

3. A device for supporting conduits and the like, comprising a conduit-engaging member equipped with vertical ribs at the sides thereof which ribs have arcuate front edges adapted to engage a cable, means engaging the upper portion of said member for supporting the same, said member depending from said supporting means, a second conduit-engaging member identical with said first-mentioned conduit-engaging member but faced in the opposite direction so that the back sides of the members are adjacent, said last-mentioned conduit member having its top portion overlapping the bottom portion of said first-mentioned member, said ribs on the sides of said first-mentioned member extending also to the rear of the member and engaging the sides of the upper overlapping portion of said second-mentioned conduit-engaging member to secure the same against lateral movement, a clamping member, and means for securing a cable between said clamping member and one of said conduit-engaging members and at the same time binding the overlapping portions of said conduit-engaging members together.

4. A device for supporting conduits and the like, comprising a conduit-engaging member having its back side serrated at the top and bottom portions, means engaging the serrated top portion of said member for supporting the same, said member depending in substantial vertical position from said means, a second conduit-engaging member identical with said first-mentioned member and having its top serrated portion engaging the bottom serrated portion of said first-mentioned conduit-engaging member, a clamping member having its one end extending through the engaged serrated portions of said conduit-engaging members, thread means for tightening said end against the conduit-engaging members to bind the clamping member to a cable and to bind the engaged portions together, a second clamping member, and means for tightening one end of said second clamping member to said second-mentioned conduit-engaging member to bind a second cable therebetween, said second clamping member having its other end received in said first-mentioned tightening means.

5. A device for supporting conduits and the like, comprising a plurality of conduit-engaging members depending one below another, means for supporting the uppermost of said members, said members being identical in structure but having alternate members reversed in position so that the back side of one member faces the back side of each adjacent member, each of said members having an end portion overlapping with an end portion of an adjacent link, and means for binding a cable to one of said members while at the same time binding said one member to an adjacent member.

6. A device as in claim 5 wherein said means includes a clamping member adapted to engage a side of a conduit and has a threaded end portion extending through the overlapping portions of said members and includes also a hollow tapped member in threaded engagement with said end portion, and which comprises also a clamping member identical with said first-mentioned clamping member adapted to engage the side of a second conduit and has its one end extended within said hollow member, and threaded means for securing the other end of said second-mentioned clamping member to a conduit-engaging member adjacent said one member.

JOSEPH BANNEYER.